United States Patent
Cheah et al.

(10) Patent No.: US 7,839,388 B2
(45) Date of Patent: Nov. 23, 2010

(54) OPTICAL NAVIGATION SYSTEM AND METHOD FOR REDUCING THE POWER CONSUMPTION OF THE SYSTEM

(75) Inventors: Chiang Sun Cheah, Penang (MY); Li Chong Tai, Penang (MY); Michael J. Brosnan, Fremont, CA (US)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 995 days.

(21) Appl. No.: 11/430,697

(22) Filed: May 9, 2006

(65) Prior Publication Data

US 2007/0262243 A1 Nov. 15, 2007

(51) Int. Cl.
*G06F 3/033* (2006.01)
*G09G 5/08* (2006.01)

(52) U.S. Cl. ..................................... 345/166; 345/163
(58) Field of Classification Search ....................... None
See application file for complete search history.

(56) References Cited

U.S. PATENT DOCUMENTS

| 5,288,993 | A  | * | 2/1994  | Bidiville et al. | 250/221 |
| 7,297,912 | B1 | * | 11/2007 | Todoroff et al. | 250/205 |
| 2005/0110746 | A1 |   | 5/2005  | Hou | |
| 2005/0231482 | A1 | * | 10/2005 | Theytaz et al. | 345/166 |

* cited by examiner

*Primary Examiner*—Alexander Eisen
*Assistant Examiner*—Andre Matthews

(57) ABSTRACT

An optical navigation system and method for reducing the power consumption of the system uses a surface quality value of a captured image frame of a target surface to selectively reduce the number of photosensitive pixel elements to be used to capture a subsequent image frame.

20 Claims, 4 Drawing Sheets

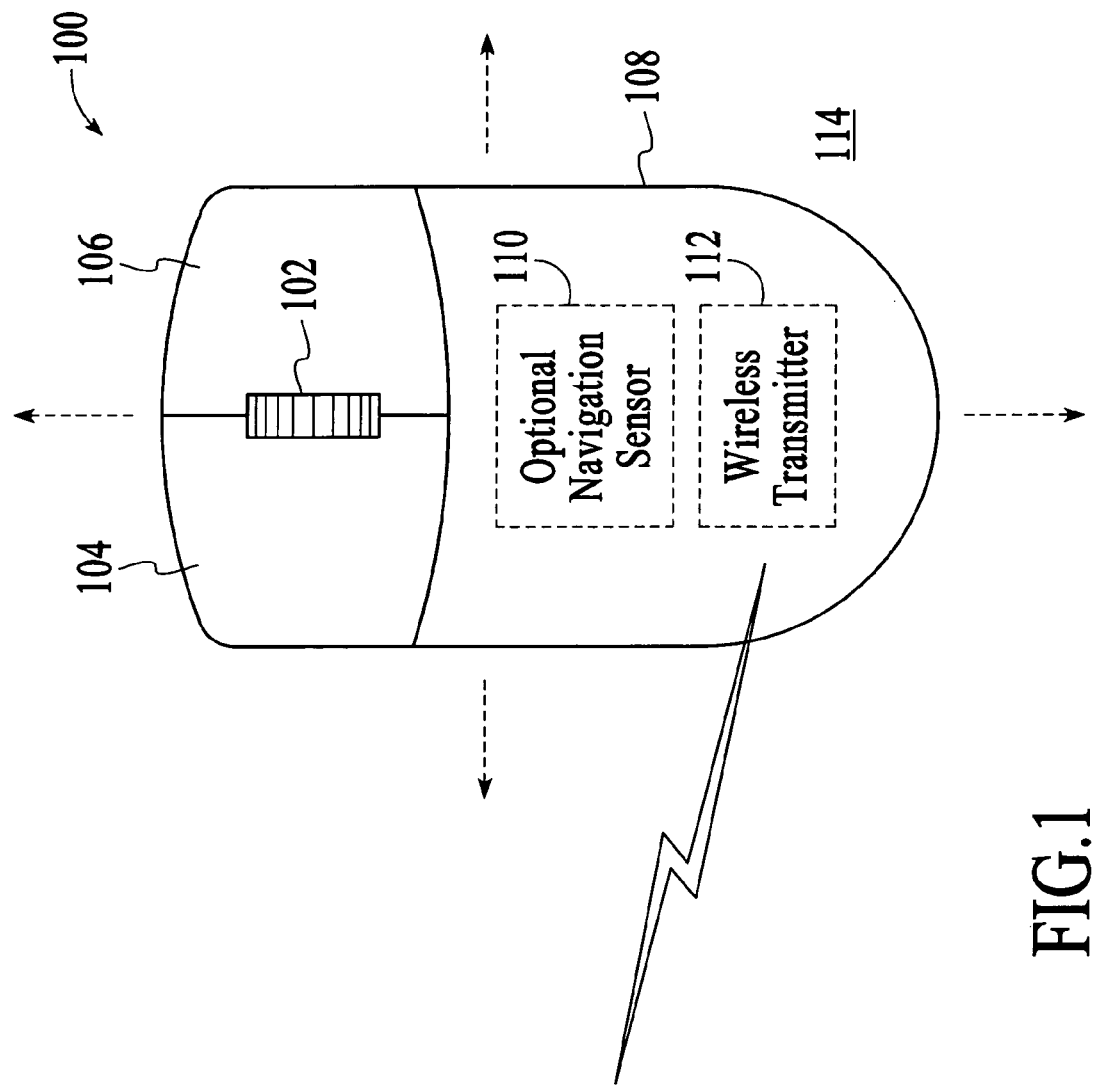
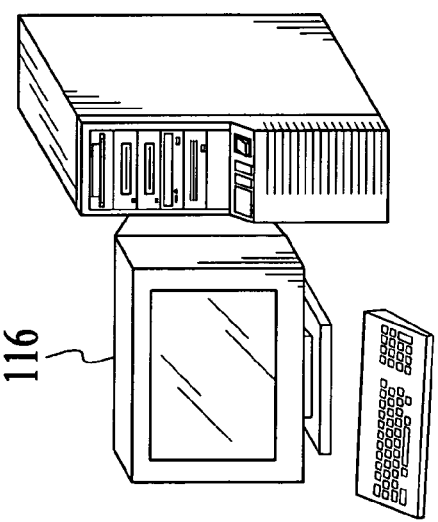
FIG.1

OPTICAL NAVIGATION SYSTEM AND METHOD FOR REDUCING THE POWER CONSUMPTION OF THE SYSTEM

BACKGROUND OF THE INVENTION

Optical navigation systems detect relative movements between the optical navigation systems and target surfaces to perform tracking operations. An optical navigation system uses a light source, such as a light-emitting diode or a laser diode, and an image sensor to successively capture image frames of a target surface. The optical navigation system compares the successive image frames and estimates the relative movements between the optical navigation system and the target surface based on the comparison between the current image frame and a previous image frame. The optical navigation system is able to track the relative movements between the optical navigation system and the target surface by continuously capturing and comparing image frames.

Optical navigation systems are commonly used in optical computer mice to track the movements of the mice relative to the surfaces on which the mice are manually manipulated. An optical computer mouse can either be corded or cordless. Since a cordless optical mouse operates on a battery, the power consumption of the optical navigation system in the optical mouse is an important consideration. There are a number of conventional techniques to reduce the power consumption of optical navigation systems.

Most conventional techniques to reduce the power consumption of an optical navigation system involve switching the optical navigation system to a sleep mode to save power when the optical mouse is not being used, i.e., when the optical mouse (and the optical navigation system) is not in motion. However, using these techniques, no power saving is achieved when the optical mouse is in motion.

There are conventional techniques that can reduce the power consumption of an optical navigation system even when the optical mouse is in motion by, for example, decreasing the rate at which the image frames are captured. Since the process of capturing an image frame equates to a certain power usage, decreasing the frame rate of the optical navigation system can reduce the power consumption of the optical navigation system. However, these power reducing techniques tend to significantly compromise the tracking performance of the optical navigation system.

In view of these concerns, what is needed is an optical navigation system and method for reducing the power consumption of the system even when in motion without significantly compromising the tracking performance of the system.

SUMMARY OF THE INVENTION

An optical navigation system and method for reducing the power consumption of the system uses a surface quality value of a captured image frame of a target surface to selectively reduce the number of photosensitive pixel elements to be used to capture a subsequent image frame. Unlike most conventional power saving techniques, the power saving technique of the optical navigation system and method works when the optical navigation system is in motion. Moreover, the power saving technique can be implemented together with other power saving techniques to significantly reduce the power consumption of the optical navigation system regardless of whether the optical navigation system is in motion.

An optical navigation system in accordance with an embodiment of the invention comprises an image sensor, a controller and a power saving module. The image sensor includes photosensitive pixel elements and is configured to capture an image frame of a target surface using a predefined number of the photosensitive pixel elements. The controller is operably connected to the image sensor and is configured to control the image sensor for image capture. The controller is further configured to compute a surface quality value of the image frame and to process the image frame to estimate displacement. The power saving module is operably connected to the controller. The power saving module is configured to monitor the surface quality value and to selectively instruct the controller to reduce the predefined number of the photosensitive pixel elements to be used to capture a subsequent image frame of the target surface based on a comparison of the surface quality value with a threshold value.

A method for reducing the power consumption of an optical navigation system in accordance with an embodiment of the invention comprises capturing an image frame of a target surface using a predefined number of photosensitive pixel elements, processing the image frame to estimate displacement, including computing a surface quality value of the image frame, comparing the surface quality value with a threshold value, and selectively reducing the predefined number of photosensitive pixel elements to be used to capture a subsequent image frame of the target surface based on the comparing of the surface quality value with the threshold value.

A method for reducing the power consumption of an optical navigation system in accordance with an embodiment of the invention comprises capturing an image frame of a target surface using a predefined photosensitive is pixel array, processing the image frame to estimate displacement, including computing a surface quality value of the image frame, comparing the surface quality value with a threshold value, and selectively reducing the said predefined photosensitive pixel array to be used to capture a subsequent image frame of the target surface based on the comparing of the surface quality value with the threshold value.

Other aspects and advantages of the present invention will become apparent from the following detailed description, taken in conjunction with the accompanying drawings, illustrated by way of example of the principles of the invention.

BRIEF DESCRIPTION OF THE DRAWINGS

FIG. 1 is a diagram of a cordless optical computer mouse in accordance with an embodiment of the invention.

DETAILED DESCRIPTION

Figure 2:
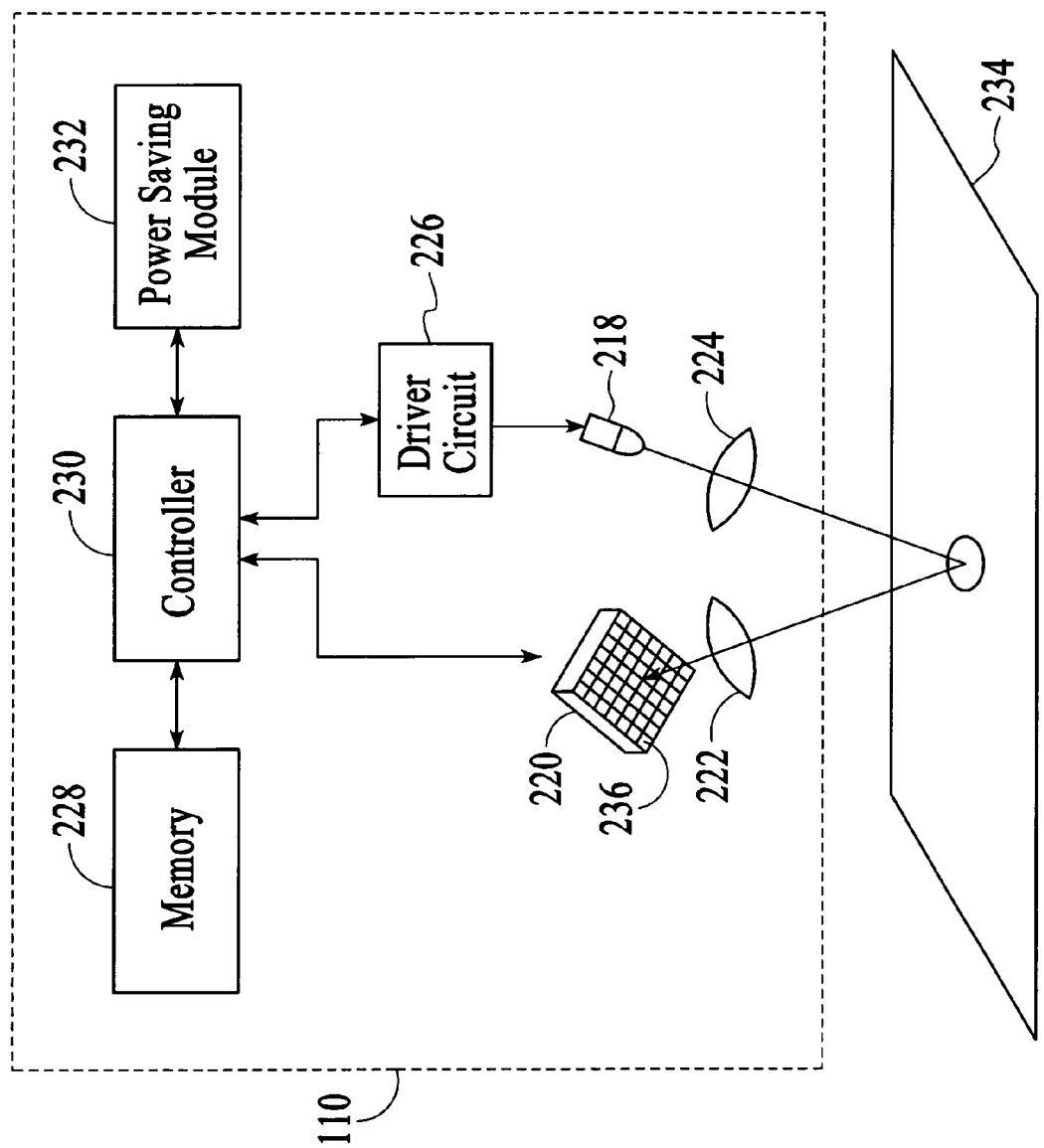
FIG. 2 is a block diagram of an optical navigation system included in the optical mouse of FIG. 1 in accordance with an embodiment of the invention.

With reference to FIG. 1, a cordless optical computer mouse 100 in accordance with an embodiment of the invention is described. As shown in FIG. 1, the optical mouse 100 includes a wheel 102, buttons 104 and 106, and a housing 108 onto which the wheel and the buttons are attached. The optical mouse 100 also includes an optical navigation system 110 and a wireless transmitter 112. The optical mouse 100 is a wireless input device that tracks movements of the mouse relative to a target surface 114 on which the mouse is manually manipulated. The optical navigation system 110 operates to successively capture image frames of the target surface 114, which are compared to estimate the relative movements between the optical mouse 100 and the target surface 114. The estimated relative movements are output as tracking information, which includes two dimensional displacement data, i.e., Δx and Δy data. The tracking information is then transmitted to an associated computer 116 via the wireless transmitter 112, which can be an infrared, radio frequency or Bluetooth transmitter. Other user inputs, e.g., button clicks or wheel rotations, are also wireless transmitted to the computer 116 via the wireless transmitter 112. As described in detail below, the optical navigation system 110 has a power saving feature that can significantly reduce the power consumption of the optical navigation system when the optical mouse 100 is being manually moved, i.e., when the optical mouse is in motion.

Turning now to FIG. 2, a block diagram of the optical navigation system 110 in accordance with an embodiment of the invention is shown. The optical navigation system 110 includes a light source 218, an image sensor 220, lenses 222 and 224, a driver circuit 226, memory 228, a controller 230 and a power saving module 232. Although these components of the optical system 110 are shown in FIG. 2 as being separate components, some of these components may be integrated. As an example, the image sensor array 220, the driver circuit 226, the memory 228, the controller 230 and the power saving module 232 may be implemented in a single integrated circuit chip. The light source 218 provides illumination to an area of a target surface 234 that is to be imaged. The location of the illuminated area changes as the optical mouse 100, including the optical navigation system 110, is moved. The light source 218 may be a light-emitting diode, a laser diode or any other light-emitting device. The light source 218 is activated by the driver circuit 226, which provides driving signals to the light source. The lens 224 is used with the light source 218 to focus the light from the light source onto the desired area of the target surface 234. The image sensor 220 electronically captures image frames of the illuminated area of the target surface 234. The image sensor 220 includes photosensitive pixel elements 236 that generate image signals in response to light incident on the elements. As an example, the image sensor 220 may be a charged-coupled device (CCD) image sensor or a complementary metal oxide semiconductor (CMOS) image sensor. The number of photosensitive pixel elements 236 included in the image sensor 220 may vary depending on at least the particular application of the optical navigation system 110. As an example, the image sensor 220 may include a 30×30 array of photosensitive pixel elements 236. The lens 222 is used with the image sensor 220 to focus light reflected off the target surface 234 onto the image sensor.

The controller 230 is configured to control the driver circuit 226 and the image sensor 220 in order to capture image frames of the target surface 234. The controller 230 is electrically connected to the driver circuit 226 and the image sensor 236 to provide control signals. The controller 230 provides control signals to the driver circuit 226 to direct the driver circuit to apply driving signals to the light source 218 to activate the light source. The controller 230 provides control signals to the image sensor 236 to accumulate electrical charges at the photosensitive pixel elements 236 and integrate at least some of the photosensitive pixel elements to produce each image frame of the target surface 234. Thus, the controller is able to control the frame rate of the image sensor 236. The controller 230 is also configured to process the captured image frames to estimate movements or displacements between the optical navigation system 110 and the target surface 234.

In an embodiment, the controller 230 estimates a displacement between the optical navigation system 110 and a target surface by cross-correlating "features" of the target surface in successive image frames. One technique to detect these surface features is to compare the contrast of each pixel to its adjacent pixels in a captured image frame. If the contrast is greater than a predefined threshold, then that pixel is considered a surface feature. These surface features will be referred to herein as surface quality features or SQUAL features. In processing the image frames, the controller 230 generates a SQUAL value for each captured image frame. The SQUAL value represents the number of SQUAL features detected in a particular image frame. The captured image frame and its SQUAL value are stored in the memory 228 to be subsequently used. As described in detail below, the SQUAL values of the captured image frames are used to reduce the power consumption of the optical navigation system 110.

The power saving module 232 performs the power saving feature of the optical navigation system 110 based on the SQUAL values. During the processing of the image frames by the controller 230, the power saving module 232 monitors the SQUAL values of the captured image frames and determines the necessary number of photosensitive pixel elements 236 of the image sensor 220 for subsequent image acquisition, i.e., the photosensitive pixel elements to be integrated for image acquisition. The photosensitive pixel elements 236 of the image sensor 220 that are integrated for image acquisition will sometimes be referred to herein as the "active photosensitive pixel elements". The number of active photosensitive pixel elements 236 of the image sensor 220 for subsequent image acquisition is reduced based on the SQUAL value of the current image frame in order to reduce the power consumption of the optical navigation system 110 without significantly affecting the tracking performance of the optical navigation system. The amount of power used to integrate the active photosensitive pixel elements 236 of the image sensor 220 for image acquisition depends on the number of active photosensitive pixel elements that are integrated to successively capture image frames. Moreover, the SQUAL value indicates whether a region of a given target surface can be effectively used by the optical navigation system 110 to properly perform the tracking operation. As an example, an optical navigation system using an image sensor with a 30×30 active pixel array require a minimum SQUAL value of eight to ten for proper tracking. Thus, by reducing the number of active photosensitive pixel elements 236 of the image sensor 220 to be integrated when the SQUAL value of the current image frame is sufficiently greater than the minimum SQUAL value for proper tracking, the power consumption of the optical navigation system 110 can be reduced without significantly compromising the tracking performance of the optical navigation system.

Figure 3:
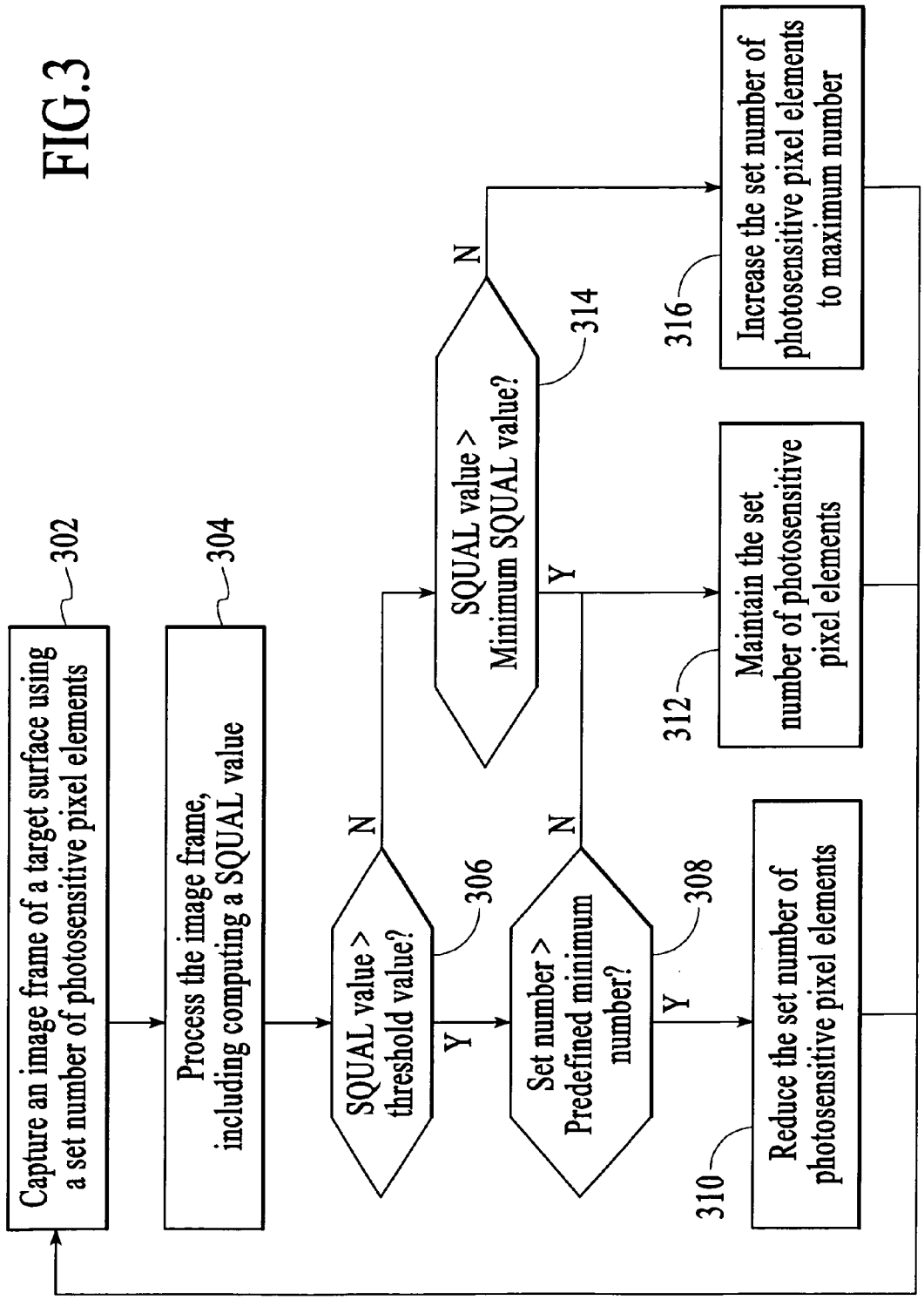
FIG. 3 is a process flow diagram of a power saving operation of the optical navigation system of FIG. 2 in accordance with an embodiment of the invention.

The operation of the power saving module 232 of the optical navigation system 110 is described with reference to a flow diagram of FIG. 3. At block 302, an image frame of a target surface is captured by the image sensor 220 using a set number of photosensitive pixel elements 236, i.e., the active photosensitive pixel elements. The image capturing process includes transmitting a control signal to the driver circuit 226 from the controller 230 so that the driver circuit applies a driving signal to the light source 218, which generates light to illuminate an area of a target surface. The reflected light from the illuminated area of the target surface is received by the photosensitive pixel elements 236 of the image sensor 220.

The active photosensitive pixels 236 of the image sensor 220 are then integrated to produce the image frame. Initially, the set number of photosensitive pixel elements 236 of the image sensor 220 to be used for image acquisition is a default number of photosensitive pixel elements of the image sensor. As an example, the default number of photosensitive pixel elements 236 of the image sensor 220 to be used for image acquisition may be all the photosensitive pixel elements of the image sensor.

Next, at block 304, the captured image frame is processed by the controller 230. The process of processing the captured image frame includes detecting SQUAL features in the image frame and computing a SQUAL value for the image frame, as well as cross-correlating the image frame with a previously captured image frame to estimate any displacement between the optical navigation system 110 and the target surface.

Next, at block 306, a determination is made by the power saving module 232 whether the current SQUAL value exceeds a threshold value. In an embodiment, the threshold value is the minimum SQUAL value required for proper tracking plus a margin value. If the SQUAL value of the current image frame exceeds the threshold value, the operation proceeds to block 308, where a determination is made by the power saving module 232 whether the current set number of photosensitive pixel elements 236 is greater than a predefined minimum number of photosensitive pixel elements for image acquisition. As an example, for an image sensor with a 30×30 pixel array, the predefined minimum number of photosensitive pixel elements may be the number of photosensitive pixel elements in a 28×28 active pixel array, i.e., seven hundred eighty four (784) pixel elements.

If the current set number of photosensitive pixel elements 236 is greater than the predefined minimum number of photosensitive pixel elements, the operation proceeds to block 310, where the power saving module 232 instructs the controller 230 to reduce the set number of photosensitive pixel elements 236 of the image sensor 220 to be integrated to capture a subsequent image frame. In an embodiment, the set number of photosensitive pixel elements 236 to be integrated is reduced by reducing the size of the active pixel array for subsequent image integration, which is achieved by turning off or deactivating the outermost row and/or outermost column of the current active pixel array for image integration by the controller 230. As an example, if the entire 30×30 pixel array of an image sensor was used for current image acquisition, the size of the active pixel array for subsequent image acquisition may be 29×30, 30×29 or even 29×29. The operation then proceeds back to block 302, where the next image frame is captured. However, if the current set number of photosensitive pixel elements 236 is not greater than the predefined minimum number of photosensitive pixel elements, the operation proceeds to block 312, where the power saving module 232 instructs the controller 230 to maintain the current set number of photosensitive pixel elements for subsequent image integration. The operation then proceeds back to block 302, where the next image frame is captured.

Turning back to block 306, if the SQUAL value of the current image frame does not exceed the threshold value, the operation proceeds to block 314, where a determination is made by the power saving module 232 whether the SQUAL value exceeds the minimum SQUAL value for proper tracking. If the SQUAL value does not exceeds the minimum SQUAL value, the operation proceeds to block 316, where the power saving module 232 instructs the controller 230 to increase the set number of photosensitive pixel elements 236 to the maximum number of photosensitive pixel elements for subsequent image acquisition, which would typically be all the photosensitive pixel elements 236 of the image sensor 220. As an example, for an image sensor with a 30×30 pixel array, the maximum number of photosensitive pixel elements will typically be all nine hundred (900) photosensitive pixel elements. The operation then proceeds back to block 302, where the next image frame is captured. However, if the SQUAL value exceeds the minimum SQUAL value, the operation proceeds to block 312, where the power saving module 232 instructs the controller 230 to maintain the current set of photosensitive pixel elements 236 for subsequent image acquisition. The operation then proceeds to block 302, where the next image frame is captured.

In this fashion, the power saving module 232 is able to selectively reduce the number of photosensitive pixel elements 236 of the image sensor 220 used for image acquisition without significantly compromising the tracking performance of the optical navigation system 110. By reducing the number of photosensitive pixel elements 236 used for image acquisition, less power is consumed per image frame since less photosensitive pixel elements translates into shorter image integration and less image data to process. A crude calculation of the power saving per image frame for an image sensor with a 30×30 pixel array shows the following results:

For the 1st row not integrated=30/900×100%=3.33% power saving.

For the 1st column not integrated=29/900×100%=3.22% power saving.

For the 2nd row not integrated=29/900×100%=3.22% power saving.

For the 2nd column not integrated=28/900×100%=3.11% power saving.

Therefore, if the optical navigation system 110 is used on a target surface with sufficient SQUAL features so that the size of the active pixel array for image acquisition can be reduced to 28×28, there will be approximately thirteen percent (13%) power saving for image acquisition per frame.

An advantage of the power saving feature provided by the power saving module 232 of the optical navigation system 110 is that the power saving feature works when the optical navigation system is in motion unlike most conventional power saving features. Another advantage is that the amount of power saving is proportional to the SQUAL features detected in a target surface. Thus, greater power saving can be achieved when a target surface has a larger number of detectable SQUAL features. Still another advantage is that the power saving feature provided by the power saving module 232 can be implemented on top of existing power saving features, such as a power saving feature that switches the optical navigation system 110 to a sleep mode when the optical navigation system is not in motion.

Figure 4:
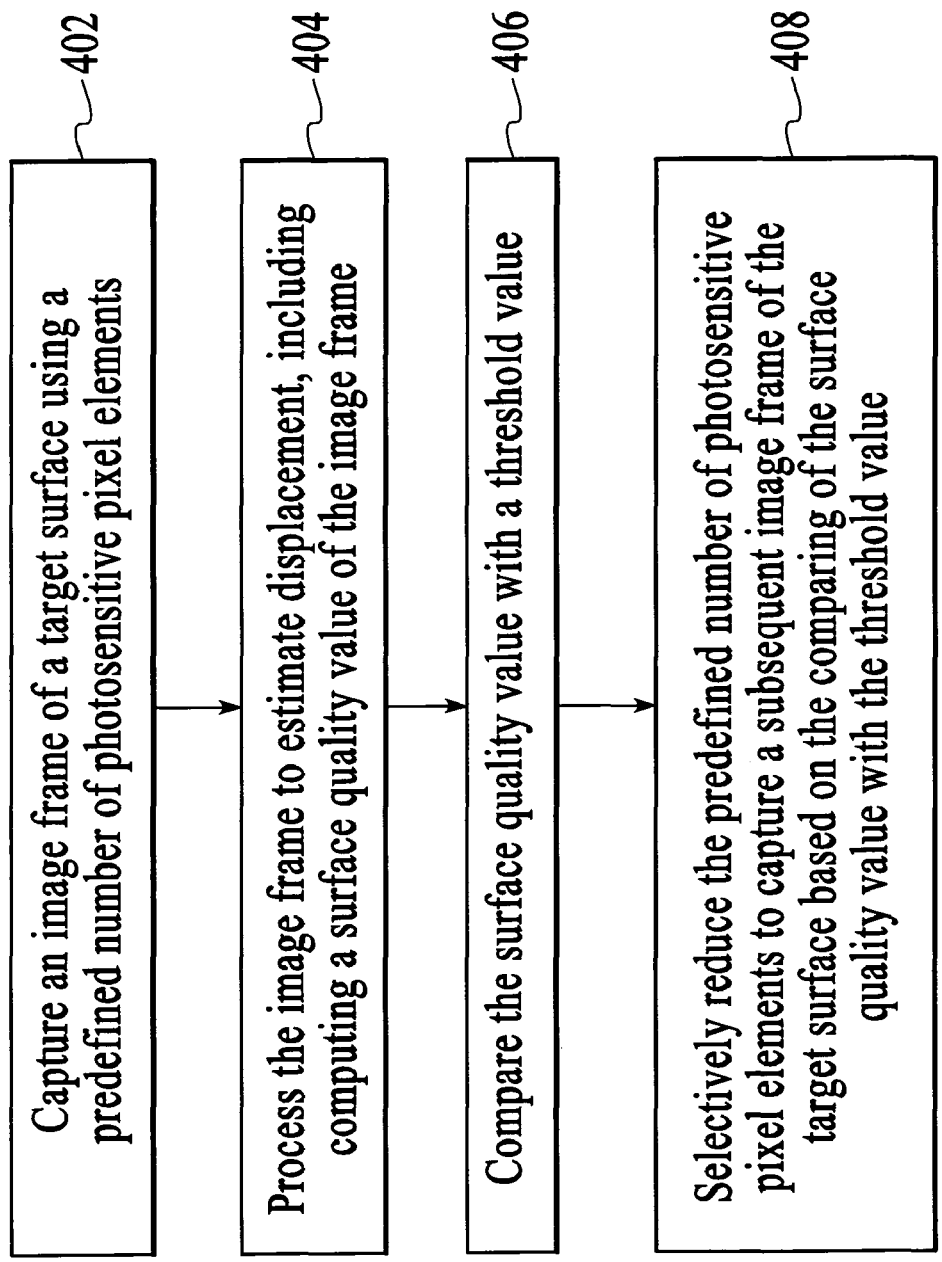
FIG. 4 is a flow diagram of a method for reducing the power consumption of an optical navigation system in accordance with an embodiment of the invention.

A method for reducing the power consumption of an optical navigation system in accordance with an embodiment of the invention is described with reference to FIG. 4. At block 402, an image frame of a target surface is captured using a predefined number of photosensitive pixel elements or a predefined photosensitive pixel array. Next, at block 404, the image frame is processed to estimate displacement. In addition, at block 404, a surface quality value of the image frame is computed. Next, at block 406, the surface quality value is compared with a threshold value. Next, at block 408, the predefined number of photosensitive pixel elements or the predefined photosensitive pixel array is selectively reduced to capture a subsequent image frame of the target surface based on the comparing of the surface quality value with the threshold value.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for reducing the power consumption of an optical navigation system, said method comprising:
   capturing an image frame of a target surface using a predefined number of photosensitive pixel elements in an array of photosensitive pixel elements;
   processing said image frame to estimate displacement, including computing a surface quality value of said image frame, said surface quality value being the number of surface features detected in said image frame using contrast between different individual pixels in said image frame;
   comparing said surface quality value with a threshold value; and
   selectively reducing said predefined number of photosensitive pixel elements in said array of photosensitive pixel elements to be used to capture a subsequent image frame of said target surface based on said comparing of said surface quality value with said threshold value.

2. The method of claim 1 wherein said comparing includes determining whether said surface quality value is greater than said threshold value.

3. The method of claim 1 wherein said threshold value includes a predefined minimum surface quality value for proper tracking and a margin value.

4. The method of claim 1 wherein said reducing said predefined number of photosensitive pixel elements includes deactivating one of an outermost row and an outermost column of said photosensitive pixel elements in said array.

5. The method of claim 1 wherein said reducing said predefined number of photosensitive pixel elements includes deactivating an outer most row and an outermost column of said photosensitive pixel elements in said array.

6. The method of claim 1 further comprising:
   comparing said surface quality value with a second threshold value; and
   selectively increasing said predefined number of photosensitive pixel elements to capture said subsequent image frame of said target surface based on said comparing of said surface quality value with said second threshold value.

7. The method of claim 6 wherein said second threshold value is a predefined minimum surface quality value for proper tracking.

8. A method for reducing the power consumption of an optical navigation system, said method comprising:
   capturing an image frame of a target surface using a predefined photosensitive pixel array;
   processing said image frame to estimate displacement, including computing a surface quality value of said image frame, said surface quality value being the number of surface features detected in said image frame using contrast between different individual pixels in said image frame;
   comparing said surface quality value with a threshold value; and
   selectively reducing said predefined photosensitive pixel array to be used to capture a subsequent image frame of said target surface based on said comparing of said surface quality value with said threshold value.

9. The method of claim 8 wherein said comparing includes determining whether said surface quality value is greater than said threshold value.

10. The method of claim 8 wherein said threshold value includes a predefined minimum surface quality value for proper tracking and a margin value.

11. The method of claim 8 wherein said reducing said predefined photosensitive pixel array includes deactivating one of an outermost row and an outermost column of said predefined photosensitive pixel array.

12. The method of claim 8 wherein said reducing said predefined photosensitive pixel array includes deactivating an outer most row and an outermost column of said predefined photosensitive pixel array.

13. The method of claim 8 further comprising:
   comparing said surface quality value with a second threshold value; and
   selectively increasing said predefined photosensitive pixel array to capture said subsequent image frame of said target surface based on said comparing of said surface quality value with said second threshold value.

14. The method of claim 13 wherein said second threshold value is a predefined minimum surface quality value for proper tracking.

15. An optical navigation system comprising;
   an image sensor including an array of photosensitive pixel elements, said image sensor being configured to capture an image frame of a target surface using a predefined number of said photosensitive pixel elements in said array;
   a controller operably connected to said image sensor, said controller being configured to control said image sensor for image capture, said controller being further configured to compute a surface quality value of said image frame and to process said image frame to estimate displacement, said surface quality value being the number of surface features detected in said image frame using contrast between different individual pixels in said image frame; and
   a power saving module operably connected to said controller, said power saving module being configured to monitor said surface quality value and to selectively instruct said controller to reduce said predefined number of said photosensitive pixel elements to be used to capture a subsequent image frame of said target surface based on a comparison of said surface quality value with a threshold value.

16. The system of claim 15 wherein said power saving module is configured to determine whether said surface quality value is greater than said threshold value.

17. The system of claim 15 wherein said threshold value includes a predefined minimum surface quality value for proper tracking and a margin value.

18. The system of claim 15 wherein said power saving module is configured to instruct said controller to deactivate one of an outermost row and an outermost column of said photosensitive pixel elements in said array.

19. The system of claim 15 wherein said power saving module is configured to instruct said controller to deactivate an outermost row and an outermost column of said photosensitive pixel elements in said array.

20. The system of claim 15 wherein said power saving module is configured to compare said surface quality value with a second threshold value, said power saving module being further configured to selectively instruct said controller to increase said predefined number of said photosensitive pixel elements to capture said subsequent image frame of said target surface based on a comparison of said surface quality value with said second threshold value.

* * * * *